2,922,268
Patented Jan. 26, 1960

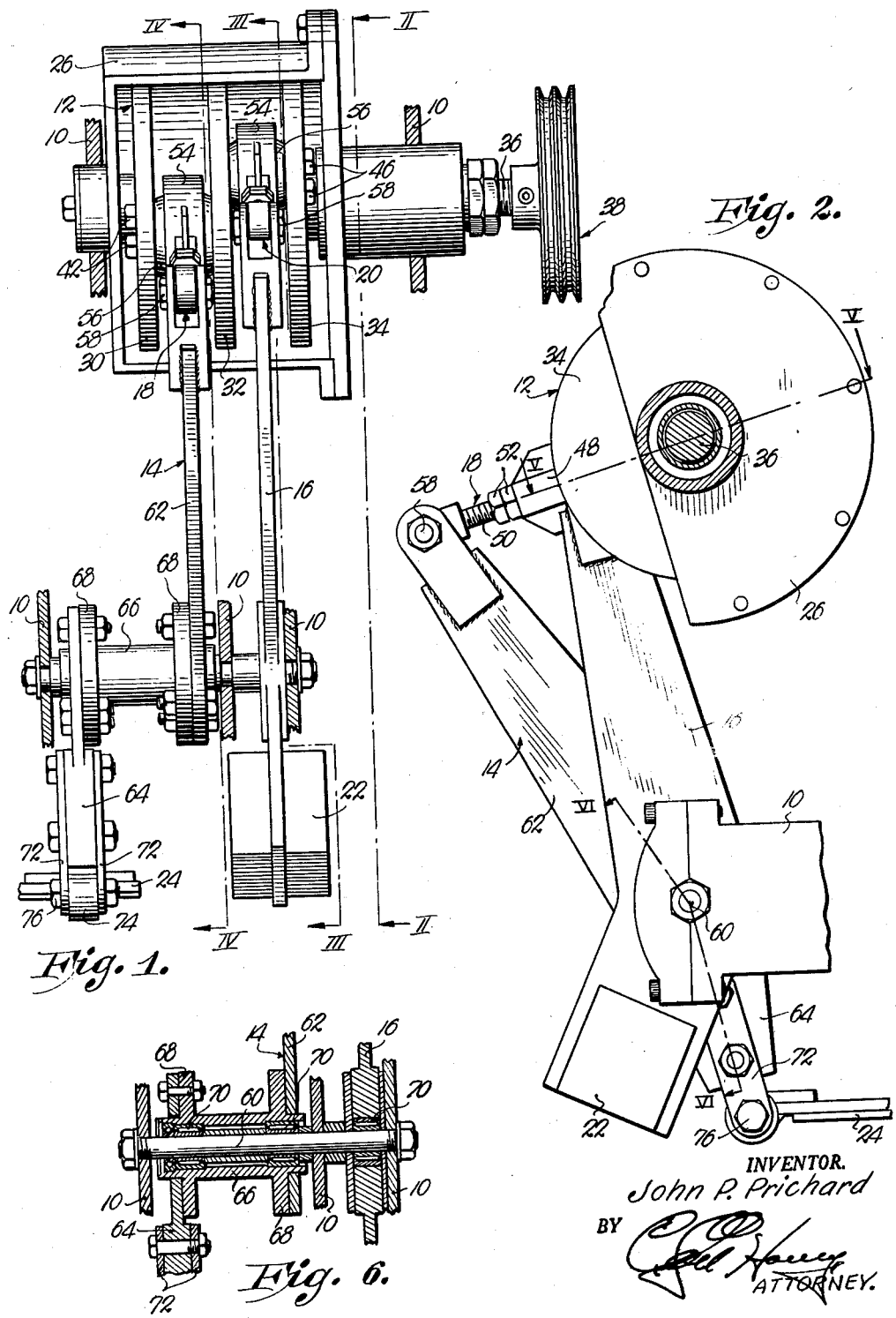

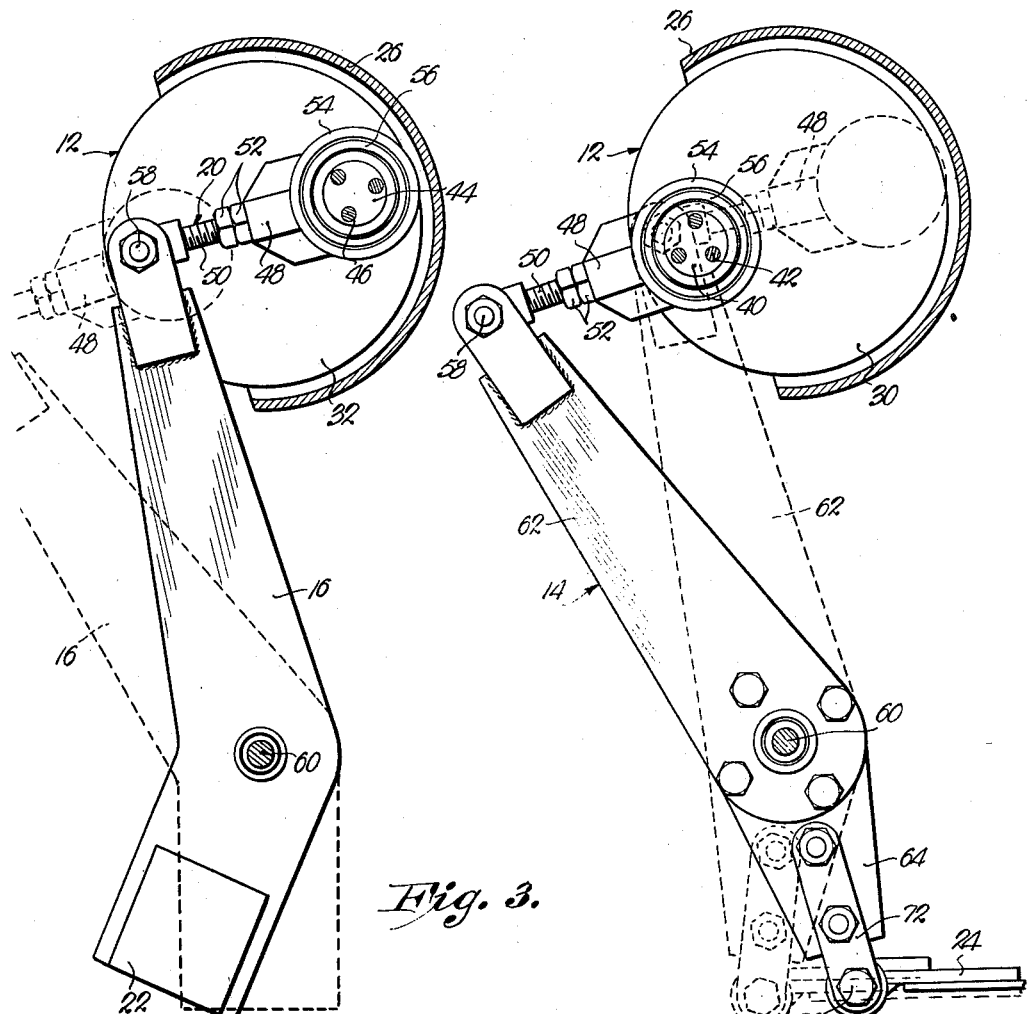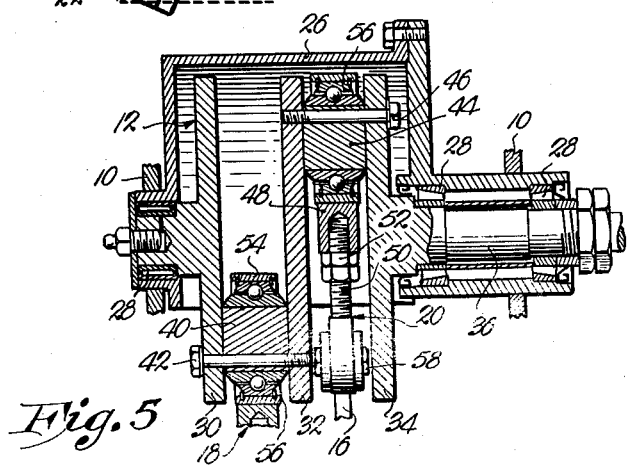

2,922,268
SICKLE DRIVER

John P. Prichard, Benton, Kans., assignor to Field Queen, Inc., Maize, Kans., a corporation of Kansas Application August 12, 1957, Serial No. 677,716

8 Claims. (Cl. 56—306)

This invention relates to improved power transmitting mechanism for driving the sickle of a harvester or the like, the primary object being to utilize a counterbalance weight in a novel manner to eliminate excessive vibration, thereby increasing the service life of the sickle itself and associated parts.

Another important object of the instant invention is to incorporate the aforementioned counterbalance weight in an assembly of parts that utilizes swingable arms which are in turn driven by connecting rods operably coupled with a crankshaft, all in lieu of the conventional pitman and wrist pin arrangement universally and most commonly employed as a sickle driver.

A further object of the instant invention is to provide a sickle driver that incorporates a crankshaft, connecting rods and associated swingable arms arranged in a manner to offset vibration by virtue of the fact that the arm carrying the counterbalance weight swings in one direction as the sickle is caused to move in the opposite direction by the arm that is connected thereto.

Other objects include important details of construction to be made clear as the following specification progresses, reference being had to the accompanying drawing wherein:

Fig. 1 is an elevational view of a sickle driver made pursuant to my present invention, showing a fragmentary part of a sickle to which the driver is operably connected, parts being broken away for clearness.

Fig. 2 is a cross-sectional view taken on line II—II of Fig. 1, showing a fragmentary part of a sickle to which the driver is operably connected, parts being broken away for clearness.

Fig. 3 is a cross-sectional view taken on irregular line III—III of Fig. 1, showing another position of one of the arms and its connection with the crankshaft in dotted lines.

Fig. 4 is a cross-sectional view taken on line IV—IV of Fig. 1, showing another position of the other arm and its connection with the crankshaft in dotted lines.

Fig. 5 is a fragmentary, cross-sectional view taken on line V—V of Fig. 2; and

Fig. 6 is a fragmentary, detailed, cross-sectional view taken on line VI—VI of Fig. 2.

All of the component parts of the sickle driver illustrated in the drawing are carried by suitable framework variously shown in Figs. 1, 5 and 6 for example, and designated by the numeral 10, it being understood however, that the manner of attachment of the unit to an implement with which the same is to be used, forms no part of the instant invention.

The said components include a crankshaft broadly designated by the numeral 12, a pair of swingable arms 14 and 16, corresponding connecting rods 18 and 20 for operably coupling arms 14 and 16 respectively with the crankshaft 12, and a counterbalance weight 22 rigidly secured to the arm 16, arm 14 being connected with sickle 24 as will hereinafter be made clear.

Crankshaft 12 is mounted within and carried by a housing 26 through use of a number of suitable bearings 28. It includes three spaced-apart coaxial discs 30, 32 and 34 that may be circular as shown in Figs. 2, 3 and 4. Shaft 36 integral with the disc 34 may be driven from any suitable prime mover, not shown, operably coupled with pulley means or the like 38, secured to the outer end of shaft 36.

A hub 40 between discs 30 and 32 interconnects the latter by virtue of through bolts 42 as is clear in Figs. 3, 4 and 5, and a similar arrangement is provided between the discs 30 and 32 by virtue of hub 44 and interconnecting bolts 46.

Each of the connecting rods 18 and 20 includes an internally tapped portion 48 receiving a bolt portion 50 for rendering the said connecting rods extensible, lock nuts 52 on the bolts 50 and bearing against the nut portion 48 holding the rods in adjusted positions. Nut portions 48 of the connecting rods are also provided with a circular collar 54 at one end thereof which circumscribe the corresponding hubs 40 and 44 for rotation relative thereto through the medium of bearings 56 interposed between the hubs and the collars 54.

It is noted also that the connecting rods 18 and 20 are in diametrically opposed relationship with respect to the axis of rotation of the crankshaft 12 and, therefore, joined to opposed throws of crankshaft 12 to act in opposite directions. A pivotal connection 58 is provided between the crankshafts 18 and 20 and their corresponding arms 14 and 16 to the end that the latter swing oppositely during rotation of the crankshaft 12.

Arms 14 and 16 swing about a common horizontal axis that is parallel with the axis of rotation of crankshaft 12, all as best illustrated in Figs. 1 and 6. A single horizontal pin 60 swingably supports the arms 14 and 16 and it is to be noted that both the counterbalance weight 22 and the sickle 24 are disposed at the lowermost ends of arms 16 and 14 respectively beneath the axis 60 of swinging movement of said arms. The arm 14 is made up of two lengths 62 and 64 that are interconnected by a hub 66. Flanges 68 on the hub 66 are employed to bolt or otherwise attach the arm lengths 62 and 64 thereto and it is to be noted in Fig. 6 that both the hub 66 and the arm 16 are swingable about the pin 60 through use of suitable bearings 70.

Opposed straps 72 attached to arm length 64, embrace sleeve 74 forming a part of sickle 24 at one end of the latter and operate to pivotally connect the arm 14 with the sickle 24 through pivot pin 76.

It is to be understood that the sickle 24 is of conventional character reciprocably carried by the sickle bar of the implement and provided with a series of triangular sections having sharpened edges which cooperate with ledger plates to sever the crop as the sickle 24 is reciprocated longitudinally thereof within a horizontal plane.

It is apparent that during operation, such reciprocable movement is imparted to the sickle 24 as the arm 14 is caused to swing about the axis of pin 60 through the crankshaft 12. At the same time, the crankshaft 12 imparts swinging movement to the arm 16, but in opposite directions and, therefore, the counterbalance weight 22, properly selected to suit all design characteristics of the assembly, will effectively reduce, if not eliminate, excessive vibration to such extent as to appreciably increase the service life of the sickle 24 and its associated parts. Obviously, the strokes of the arms 14 and 16 may be varied by virtue of the adjustment that is provided inherently within the connecting rods 18 and 20 as above described.

Having thus described the invention what is claimed as new and desired to be secured by Letters Patent is:

1. In a sickle driving unit, a crankshaft; a vertically swingable driver arm and a vertically swingable balancing arm, the latter being provided with a counterbalance weight; and a connecting rod attached to each arm respectively, said rods being joined to opposed throws of said crankshaft to act in opposite directions, the counterbalance weight depending from the axis of swinging movement thereof whereby the same eliminates excessive vibration through the combined action of gravity and momentum.

2. In a sickle driving unit, a crankshaft; a driver arm and a balancing arm; means mounting the arms for swinging movement about a common, horizontal axis, the balancing arm being provided with a counterbalance weight; and a connecting rod attached to each arm respectively, said rods being joined to opposed throws of said crankshaft to act in opposite directions, the counterbalance weight depending from the axis of swinging movement thereof whereby the same eliminates excessive vibration through the combined action of gravity and momentum.

3. In a sickle driving unit, a rotatable crankshaft; a driver arm and a balancing arm; means mounting the arms for swinging movement about a common, horizontal axis disposed in spaced parallelism to the axis of rotation of the crankshaft, the balancing arm being provided with a counterbalance weight; and a connecting rod attached to each arm respectively, said rods being joined to opposed throws of said crankshaft to act in opposite directions, the counterbalance weight depending from the axis of swinging movement thereof whereby the same eliminates excessive vibration through the combined action of gravity and momentum.

4. In a sickle driving unit, a crankshaft; a vertically swingable driver arm, and a vertically swingable balancing arm, the balancing arm being provided with a counterbalance weight; and a connecting rod attached to each arm respectively, said rods being extensible for varying the stroke of the arms, and being joined to opposed throws of said crankshaft to act in opposite directions, the counterbalance weight depending from the axis of swinging movement thereof whereby the same eliminates excessive vibration through the combined action of gravity and momentum.

5. In a sickle driving unit, a rotatable crankshaft; a driver arm and a balancing arm; means mounting the arms for swinging movement about a common horizontal axis disposed in spaced parallelism to the axis of rotation of the crankshaft, the balancing arm being provided with a counterbalance weight; and a connecting rod pivotally attached to each arm respectively at the upper ends thereof, said rods being joined to opposed throws of said crankshaft to act in opposite directions, the counterbalance weight being attached to the lower end of the balancing arm whereby the same eliminates excessive vibration through the combined action of gravity and momentum.

6. In a sickle driving unit, a rotatable crankshaft; a driver arm and a balancing arm; means mounting the arms for swinging movement about a common horizontal axis disposed in spaced parallelism to the axis of rotation of the crankshaft, said balancing arm being provided with a counterbalancing weight, said driver arm having a hub intermediate the ends thereof and a pair of spaced, oppositely extending lengths, said axis passing through the hub; and a connecting rod pivotally attached to each arm respectively at one end thereof, said rods being joined to opposed throws of said crankshaft to act in opposite directions, the counterbalance weight depending from the axis of swinging movement thereof whereby the same eliminates excessive vibration through the combined action of gravity and momentum.

7. In a sickle driving unit, a rotatable crankshaft; a driver arm and a balancing arm; means mounting the arms for swinging movement about a common horizontal axis disposed in spaced parallelism to, and in substantially the same vertical plane as, the axis of rotation of the crankshaft, said balancing arm being provided with a counterbalancing weight, said driver arm having a hub intermediate the ends thereof and a pair of spaced, oppositely extending, horizontally offset lengths, said axis passing through the hub; and a connecting rod pivotally attached to each arm respectively at the upper end thereof, said rods being joined to opposed throws of said crankshaft to act in opposite directions, said rods being extensible for varying the stroke of the arms, the counterbalance weight depending from the axis of swinging movement thereof whereby the same eliminates excessive vibration through the combined action of gravity and momentum.

8. The invention of claim 7, said crankshaft including a plurality of spaced, vertical discs and a driven shaft, a first of said discs being rigid to said driven shaft for rotation therewith, a second of said discs being mounted for rotation about a horizontal axis in spaced alignment with the driven shaft, one of the rods being between the first disc and a third of said discs and pivotally interconnecting the same, the other rod being between the second disc and said third disc and pivotally interconnecting the same.

References Cited in the file of this patent

UNITED STATES PATENTS

| | | |
|---|---|---|
| 2,428,924 | Albertson | Oct. 14, 1947 |
| 2,448,078 | Brown | Aug. 31, 1948 |
| 2,619,839 | Love | Dec. 2, 1952 |

FOREIGN PATENTS

| | | |
|---|---|---|
| 1,099,838 | France | Mar. 23, 1955 |

OTHER REFERENCES

"Service Education Manual No. 4" (F-EO Mower): copyright 1953, Harry Ferguson, Inc. (page 4 relied on).